Henry Petersen, Inventor

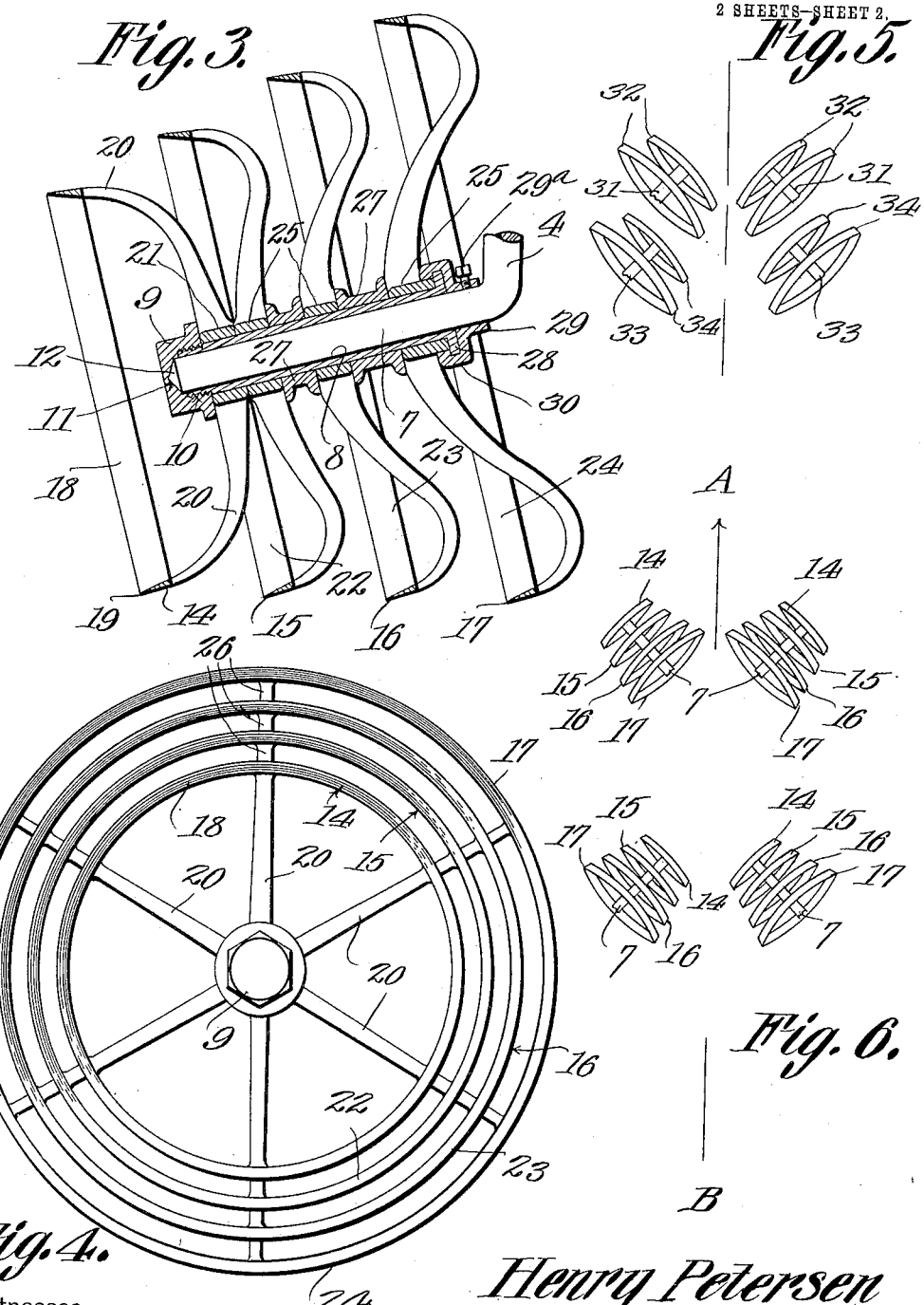

UNITED STATES PATENT OFFICE.

HENRY PETERSEN, OF MOUNT AUBURN, IOWA.

CULTIVATOR.

1,084,166. Specification of Letters Patent. Patented Jan. 13, 1914.

Application filed October 8, 1912. Serial No. 724,575.

*To all whom it may concern:*

Be it known that I, HENRY PETERSEN, a citizen of the United States, residing at Mount Auburn, in the county of Benton and State of Iowa, have invented a new and useful Cultivator, of which the following is a specification.

The device constituting the subject matter of this application, is an agricultural machine adapted to be employed for the purpose of cutting the weeds between standing rows.

The invention aims to provide a series of cutting blades of novel and improved form, the blades being arranged in novel relation with respect to each other and to the soil.

A further object of the invention is to provide two or more gangs of soil engaging members, adapted to coöperate with each other in a novel manner, in severing the vines or weeds and in hilling up the row of standing plants.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
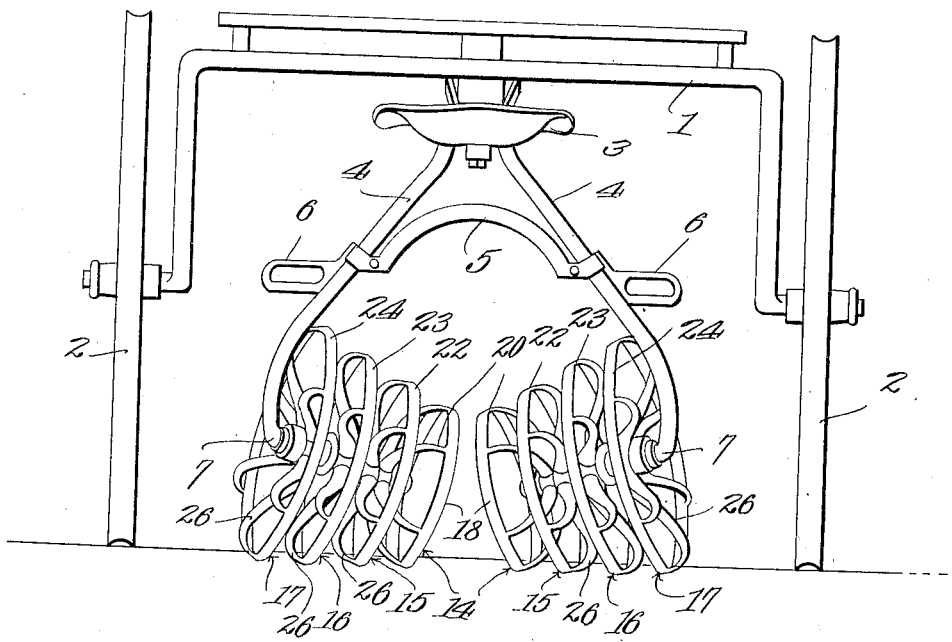
Figure 2:
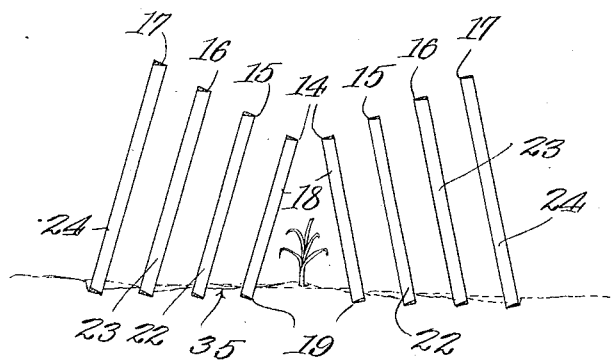

In the accompanying drawings—Figure 1 shows the invention in rear elevation; Fig. 2 is a diagrammatic view, in the nature of a rear elevation, the view being introduced for the purpose of depicting the manner in which the soil engaging blades of the gangs coöperate in hilling up the row of standing plants; Fig. 3 is a section showing one gang of soil engaging members mounted upon the axle; Fig. 4 is an end elevation of one gang of soil engaging members; and Figs. 5 and 6 are diagrammatic views illustrating the various arrangements of gangs.

Referring particularly to Fig. 1, there is shown a frame 1 supporting ground wheels 2 and a seat 3. Downwardly diverging hangers 4 are pivotally connected with the frame 1, the hangers being united by a yoke 5 terminally provided with foot holds 6. The lower ends of the hangers 4 terminate in axles 7, which, in operation lie upon opposite sides of the row of standing plants.

Upon each axle 7 is journaled for rotation, a tubular shaft 8. The advanced end of the tubular shaft 8 carries an abutment which may be of any desired form. In the present instance, the abutment consists of a cap nut 9 which is threaded as indicated at 10 upon the advanced end of the tubular shaft 8. The inner end face of the cap nut 9 is provided with a conical recess 11, the end of the axle 7 being of conical form, as indicated at 12, so as to register for rotation in the recess 11 of the cap nut 9.

The invention further includes a series of annular, soil-engaging members denoted generally by the reference characters 14, 15, 16 and 17. The soil-engaging member 14 comprises an annular rim or blade 18, taking the form of a very narrow flaring hoop or band, the same being sharpened at its forward edge, as shown at 19. A plurality of spokes 20 connect the rim or blade 18 with a hub 21 which is mounted upon the tubular shaft 8; although any suitable means may be provided for uniting the rim 18 with the shaft. As shown, although not of necessity, the spokes 20 are of continuously curved form, thereby to dispose the rim or blade 18 of the soil-engaging member 14 in advance of the forward end of the axle 7.

The blades 22, 23 and 24 of the soil-engaging members 15, 16 and 17, respectively, resemble, in general construction, the rim or blade 18 of the soil-engaging member 14. Any suitable means may be provided for uniting the blades 22, 23 and 24 with the tubular shaft 8. In the present embodiment of the invention, the blades 22, 23 and 24 are connected with their hubs 25 by means of spokes 26 which are reversely curved. The form of the spokes 26 may be varied, however, without jeopardizing the utility of the invention. If desired, but not of necessity, spacing spools 27 may be employed at any suitable points on the tubular shaft 8, for the purpose of maintaining the soil-engaging members in properly spaced relation with respect to each other. However, the use of the spools 27 is optional.

The hub 25 of the soil-engaging member 17 may be received terminally by a projection of any sort, located upon the shaft 7. As shown, a collar 28 is formed integrally with the outer end of the tubular shaft 8, for the purpose above specified. A dust cap is provided, the dust cap comprising a sleeve 29 which surrounds the axle 7 to the rear of the collar 28, the dust cap including a head 29 which incloses the periphery of the collar 28. A set screw 29ª may be threaded through the sleeve 29, into engagement with the axle 7.

The blades 18, 22, 23 and 24 of the several soil-engaging members are disposed ordinarily, at an angle to the axis of the axle 7, the longer dimensions of the several blades being disposed at an angle to the soil, the axle 7 slanting upwardly and outwardly, from its inner end toward its outer end. The angle defined by the blades and the axis of the axle 7 (meaning thereby the angle, defined by a line which bisects the angle between the inner and outer face of the blade, and the axis of the axle 7) varies from approximate parallelism with the axle, to a 30° angle with the axis of the axle. The blades 18, 22, 23, and 24 increase successively in diameter toward the outer elevated end of the axle 7, the soil-engaging edges of all of the blades being disposed at their points of engagement with the earth, secant to a horizontal line.

The blades in cross section are in the shape of a wedge. The inner and outer faces of the blades preferably constitute parts of two conical surfaces; the cone of which the outer face constitutes a part being longer than the cone of which the inner face constitutes a part; and thus the wedge-like cross section is defined.

In Figs. 5 and 6, the line A—B designates the draft line and it is to be observed that the axle 7 is positioned at an acute angle to the draft line, the several blades being likewise positioned at an acute angle to the draft line. Consequently, when the machine is drawn forwardly, the several soil-engaging members will be rotated by the forward movement of the machine the forward movement having a component tending to rotate the soil-engaging members. The several soil-engaging members require no prime mover of any sort to rotate them, the mere forward movement of the machine serving to effect the desired rotation.

The lower part of Fig. 6 indicates diagrammatically, the positions of the axles 7 with respect to the draft line A—B when the gangs are arranged as shown in Fig. 1. Under such circumstances, the axles 7 of the two gangs converge toward the draft line and in the direction of travel. However, as shown in the upper part of Fig. 6, the axles 7 may be placed to diverge in the direction of travel. The soil-engaging members 14 in either instance, will be forwardly presented, but when the gangs are positioned, as shown in the lower part of Fig. 6, the soil-engaging members as they rotate, will tend to move the earth toward the row of standing plants, it being understood that the gangs travel upon opposite sides of the row of standing plants. When, however, the gangs are positioned in diverging relation as shown in the upper part of Fig. 6, the soil-engaging members as they rotate, will tend to move the earth in opposite directions away from the row of plants.

As shown in Fig. 5, it is possible to provide a pair of converging axles indicated at 31, each of the axles 31 carrying two soil-engaging members 32. The soil-engaging members which are carried by the axles 31 are ordinarily soil-engaging members of relatively large diameters, the smaller soil-engaging members being removed. To the rear of the axles indicated at 31, and outside of the zone which is swept by the soil-engaging members 32, another pair of axles may be placed as indicated at 33, the axles 33 carrying soil-engaging members 34, as above described.

In practical operation, the gangs move forwardly upon opposite sides of a line of standing plants, a zone being cleared of weeds, on each side of the line. Owing to the fact that the blades 18, 22, 23 and 24 are of successively increasing diameters, and owing to the fact that axles 7 are disposed acutely with respect to the draft line, any standing weeds which are missed by one of the blades will be cut down by the blades which are in the rear. The blades 18, 22, 23 and 24 cut a thin slice from the top of the soil, owing to the fact that these blades are disposed at an angle to the horizontal. This slice, however, will not merely ride unbrokenly, across the blades, the spokes serving to break up the slices, and, to some extent, to cultivate the soil. Attention is directed at this point to the fact that the several blades 18, 22, 23 and 24 are in the form of flaring hoops or bands, and ordinarily are not more than an inch wide in their longer transverse dimensions. Consequently, there will be no piling up of the soil, as the blades move therethrough to sever the weeds or vines. Owing to the fact that the blades are narrow, the soil will pass over the blades and drop, before the spokes interfere with the soil. The blades cut through the soil but do not roll or lift it, as is the case when vertical, open blades are employed. Owing to the fact that each blade is in the form of a narrow flaring hoop or band, ordinarily not more than an inch wide, the soil is not compelled to ride up a long incline and then to drop into place. There is, consequently, a minimum soil disturbance, and the machine is rendered easy to propel. Since the several soil-engaging members are centrally open, there is no possibility for the earth to ball up adjacent to the center of each soil-engaging member, and since the earth can not ball up at the center of the soil-engaging member, there will be no compression of the earth in advance of the cutting edge of the blade or band. In this regard, the device herein disclosed is to be distinguished clearly from structures of that type in which a gang of centrally imperforate disks are drawn over the ground, the axes of the disks being at an angle to the surface of the earth.

The curvature given to all of the spokes permits the soil and vegetable growths to pass between the spokes as the soil is turned, without permitting the growths to be caught upon the spokes. Owing to the fact that the axles 7 are positioned at an acute angle to the draft line, the vines and weeds will be prevented from being caught and dragged along, the several blades being given, thereby, a draw cut upon the vines. In a wet or heavy soil, the angle between the axles 7 and the draft line will be increased, thereby bringing the several blades more nearly into parallelism with the draft line. When the parts are thus positioned, the shearing effect of the blades will be increased.

Attention is directed to the fact that the blades 18, 22, 23 and 24 are disposed at an angle with respect to the axis of the axle 7 which angle lies between approximate parallelism with the axle and an angle of 30° with respect to the axle. So far as I am advised as to the state of the art, no one hitherto has proposed to position open centered soil-engaging blades as above mentioned. The advantage attendant upon this particular disposition of the blades, lies in the fact that it permits the axle 7 to be tilted at such an angle that all of the blades will come into contact with the ground simultaneously, and, at the same time, all of the blades will be so positioned with respect to the ground that they will exercise a maximum cutting or slicing effect without crowding the soil ahead and without elevating the soil to too great an extent, as it passes transversely across the several blades. The foregoing is of peculiar importance when it is recalled that the blades are narrow and, ordinarily, are not of greater width than an inch or less.

Notice is to be taken that there is a great difference between the device herein disclosed, and the work it performs, and the structure and operation of other open centered disks. Other open centered disks ordinarily stand in a perpendicular position and do not and cannot perform the work that the present structure will carry out. In the device herein disclosed, the gang of soil-engaging members with their flaring hoop-like shearing elements of different sizes are inclined with respect to the ground so that all of the shearing elements can penetrate the soil to the same depth, thereby shearing the weeds and forcing the greater part of the earth through the central openings in the disks. The soil is thus mixed and pulverized and is left in a mulched condition. It is to be observed particularly that the disk herein disclosed does not lift the earth as do those structures which employ a vertical blade.

Recalling that a speedy passage of the soil transversely of the blade is desirable, it may be noted that the curved spokes do not interfere with the soil until the soil has passed across the blades. Thereupon, the spokes serve to stir and mix the soil, the soil, in every instance, falling into the furrow which is made by that particular soil-engaging member across which the soil has passed, and not into the furrow made by another soil-engaging member.

It will be understood readily, that the greater proportion of the soil which is stirred by any one soil-engaging member passes through such soil-engaging member. However, there is a small percentage of the soil which does not pass through the member whereby the stirring is accomplishd. This small percentage of soil, as the machine advances, is forced by each member toward the row of plants, reference being had particularly to Fig. 2. Since the soil-engaging members gradually increase in diameter as they extend away from the row of plants, the amount of soil deposited by each soil-engaging member will decrease from the row of plants outwardly, because the soil-engaging members are of smaller diameter adjacent row of plants that at points remote therefrom, it being obvious that more soil will pass through a soil-engaging member of large diameter than will pass through a soil-engaging member of small diameter; and conversely, more soil will be advanced toward a row of plants by those soil-engaging members which are adjacent the row of plants, than by those soil-engaging members which are remote from the row of plants. As a consequence of the foregoing, the soil is left smooth and without furrows. The soil, upon both sides of the row of plants will slant away from the row, at a gentle incline, as clearly shown in Fig. 2 and as designated by the reference character 35. If the soil-engaging members are to permit the desired amount of soil to pass through them, and at the same time are to build up the slope indicated at 35 in Fig. 2, obviously, the angle defined by the longer dimension of each blade and the horizontal and the angle defined by the longer dimension of each blade and the axle 7 is of importance, the particular angle hereinbefore specified being peculiarly efficient for the ends above mentioned. Owing to the particular angle at which the blades of the soil-engaging members are disposed, each soil-engaging member will advance the proper amount of earth toward the row of plants, blades which are disposed in a manner different from the herein disclosed, being inefficient and unsatisfactory, in that they advance too much of the soil toward the row. In this connection it is to be noted that the curved spokes are of importance, in that they serve to prevent too much earth from being carried toward the row.

Attention is directed to the fact that the tubular shaft 8 is entirely closed at its outer end, through the medium of the cap nut 9. Owing to this construction and owing to the further fact that the tubular shaft 8 is inclined at an angle to the horizontal, that end of the shaft 8 which is closed by the cap 9 constitutes an oil reservoir. The foregoing is of particular importance when it is noted that the axle 7 abuts against the cap 9, so that the cap constitutes a thrust bearing. Not only does the cap 9 constitute a thrust bearing, but as well, the cap, being connected with the outer end of the tubular shaft 8 serves to reduce to a great extent, the friction between the shaft 8 and the axle 7. The cap 9 constitutes at once, a dust excluding member and a bearing. The cap 9, therefore, exercises four functions. First, it serves to close the outer end of the tubular shaft 8. Second, it constitutes a means for moving the several soil engaging members 14, 15, 16 and 17 longitudinally of the tubular shaft 8, and for holding these members in abutment, rigidly on the shaft. Third, the cap 9 constitutes a thrust bearing or abutment for the end of the axle 7. Fourth, owing to the fact that the advanced end of the axle 7 is received in the recess 11 of the cap 9, the cap 9 serves to center the axle with respect to the shaft 8 and to reduce the friction between the axle and the shaft.

Referring particularly to Fig. 1 it will be observed that the axles 7, at their adjacent, inner ends, are tipped downwardly at an angle to the horizontal. Owing to this construction, the lower, ground engaging portion of the soil engaging member 17 may be placed as close as may be desired to the ground wheel 2, without bringing the lower ends of the hangers 7 into engagement with wheels 2. Consequently, the soil may be cultivated as close as desired to the wheels 2, and at the same time not come in contact with the wheels.

The cutting edges of the soil engaging members do not stand at right angles to the direction of the draft, and consequently the soil engaging members will not quiver and shake in the soil, as must necessarily occur if the soil engaging members were disposed at right angles to the line of draft.

As far as I am advised as to the state of the art, it is novel to provide a series of rotating, open centered soil engaging members of successively decreasing diameters, the soil engaging faces of the members being disposed at an angle to the horizontal, all of the cutting edges of the soil engaging members penetrating the earth to an equal extent, and being located in a common horizontal plane.

Having thus described the invention what is claimed is:—

1. In a device of the class described, a series of rotatable soil engaging members comprising centrally open, flaring hoop-like blades of successively decreasing diameters, the soil engaging faces of the blades being disposed at an angle to the horizontal and all of the blades lying secant to and having their lower edges in a common horizontal line, whereby all of the blades will penetrate the soil to an equal depth.

2. In a device of the class described, annular narrow, centrally-open, soil engaging blades of successively decreasing diameters, the blades having a common axis, the longer transverse dimensions of the blades being disposed at an angle to the axis, said angle lying between parallelism to the axis and an angle of 30° with respect to the axis.

3. In a device of the class described, annular narrow, centrally-open, soil engaging blades of successively decreasing diameters, the blades having a common axis, the longer transverse dimensions of the blades being disposed at an angle to the axis, said angle lying between parallelism to the axis and an angle of 30° with respect to the axis, said axis being disposed at an acute angle to the draft line.

4. In a cultivator, a narrow centrally open, flared soil engaging member, and means for supporting the soil engaging member at an angle to the draft line, and at an angle to the surface of the soil; the flare of the member and the relation of the member with respect to the soil and to the draft line serving to dispose the forward edge of the blade at the outer edge of the furrow and to prevent a crowding of the soil longitudinally and transversely of the furrow, by the outer surface of the blade, thereby preventing a lifting of the blade.

5. In a device of the class described, rotatable soil engaging members comprising centrally open, flaring, hoop-like blades, the soil-engaging faces of the blades being disposed at an angle to the axis, said angle lying between parallelism to the axis and an angle of 30° with respect to the axis, the blades having roomy spokes to assist the soil to pass through the members, the spokes being connected to the rear parts of the blades and continuing backward somewhat of the blades and then turning and connecting to the hubs of the members.

6. In a device of the class described, rotatable soil engaging members comprising centrally open, flaring, hoop-like blades, the blades having roomy spokes to assist the soil to pass through the members, the spokes being connected to the rear parts of the blades and continuing backward somewhat of the blades and then turning and connecting to the hubs of the members.

In testimony that I claim the foregoing as my own, I have hereto affixed my signature in the presence of two witnesses.

HENRY PETERSEN.

Witnesses:
SELINA WILLSON,
MASON B. LAWTON.

Copies of this patent may be obtained for five cents each, by addressing the "Commissioner of Patents, Washington, D. C."